W. A. SWAREN.
VOTING MACHINE.
APPLICATION FILED SEPT. 6, 1906.
1,001,705.
Patented Aug. 29, 1911.
5 SHEETS—SHEET 1.
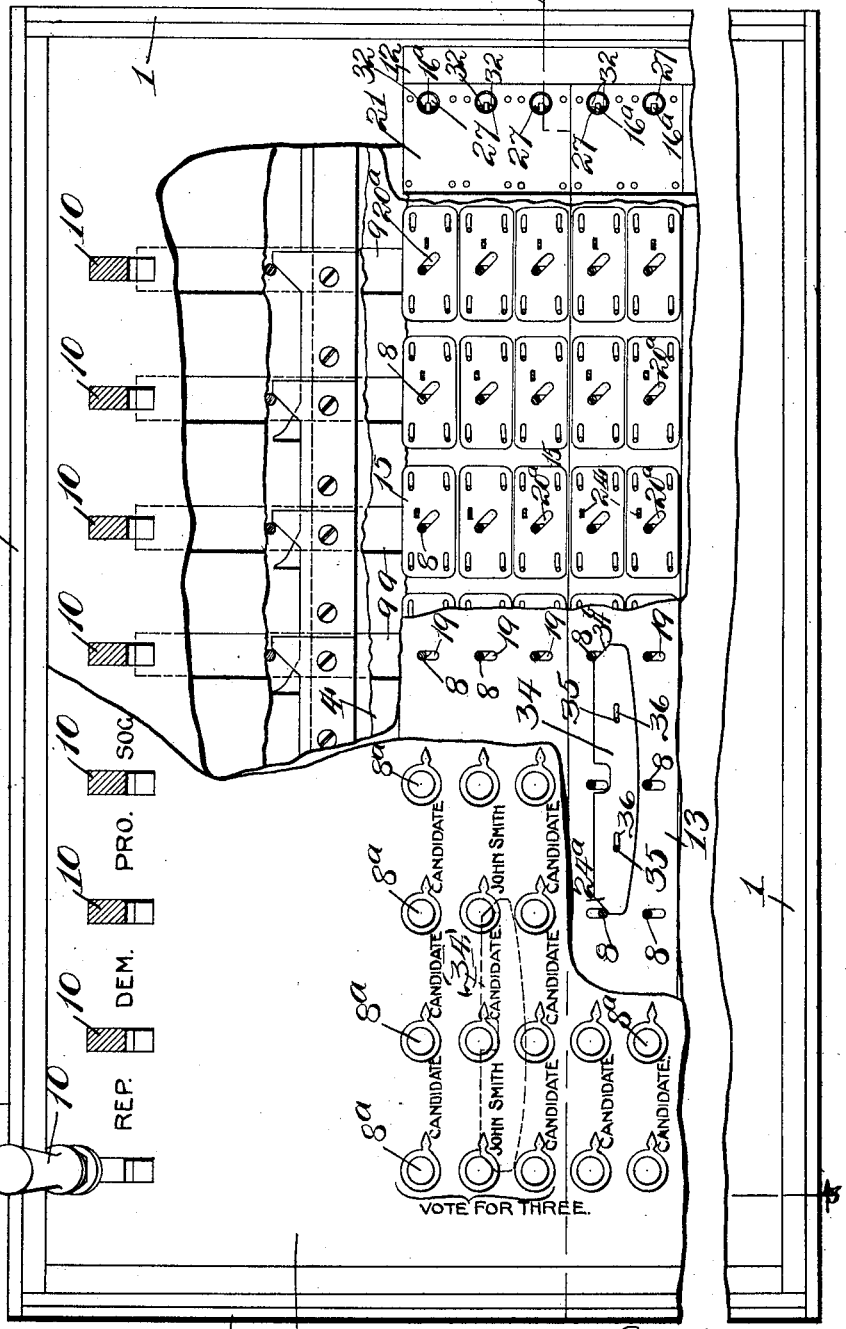

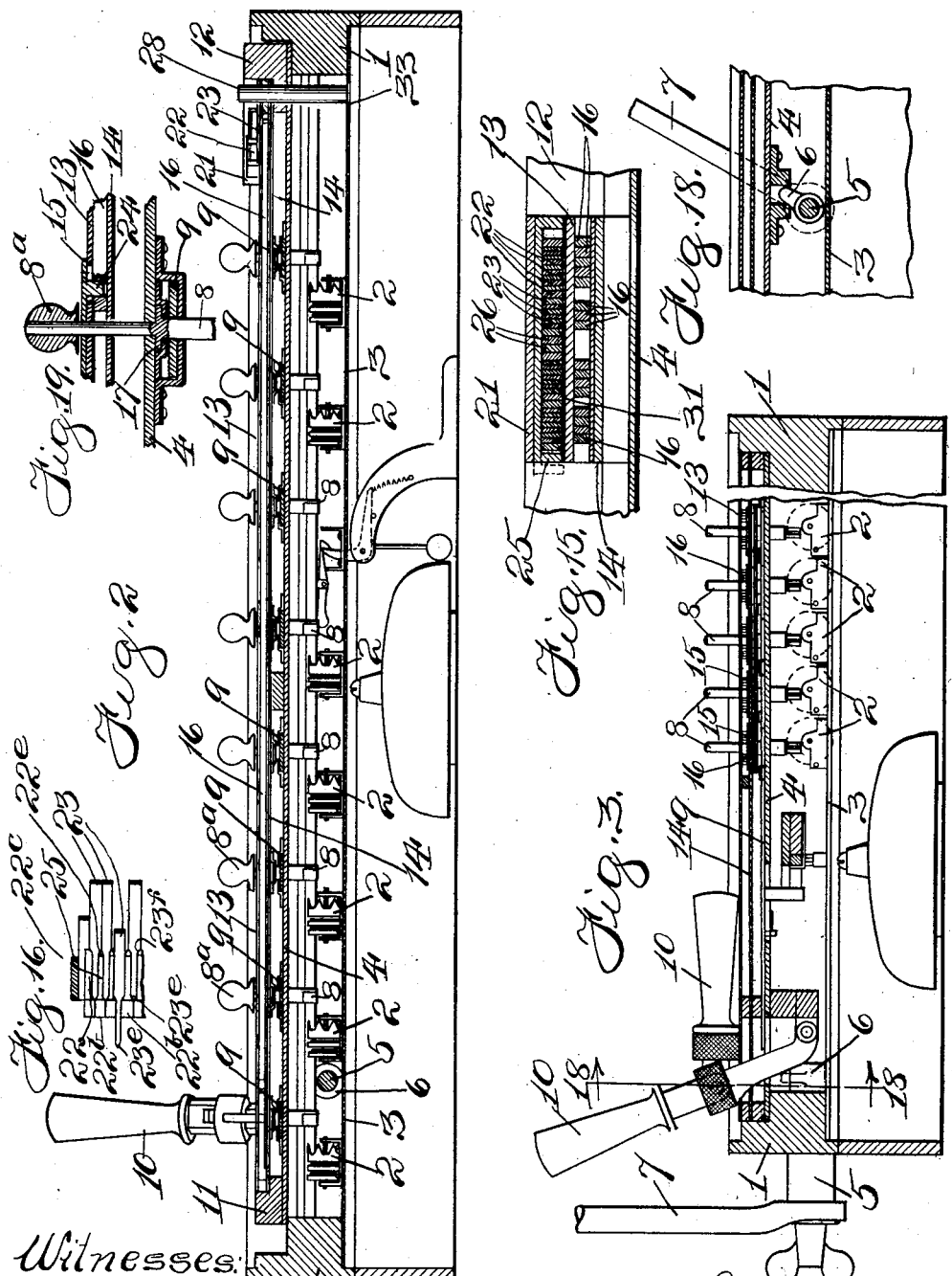

W. A. SWAREN.
VOTING MACHINE.
APPLICATION FILED SEPT. 6, 1906.
1,001,705.
Patented Aug. 29, 1911.
5 SHEETS—SHEET 3.
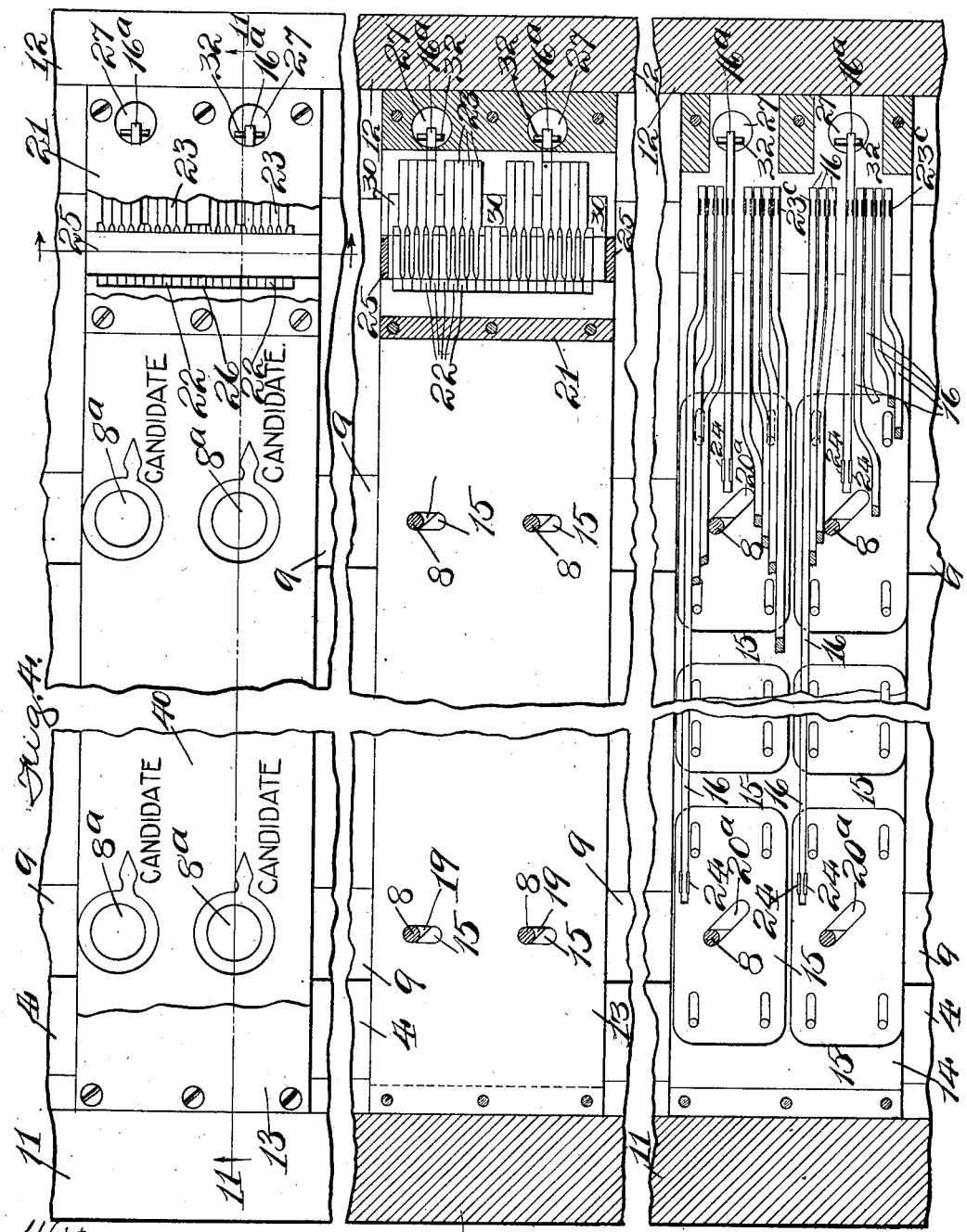

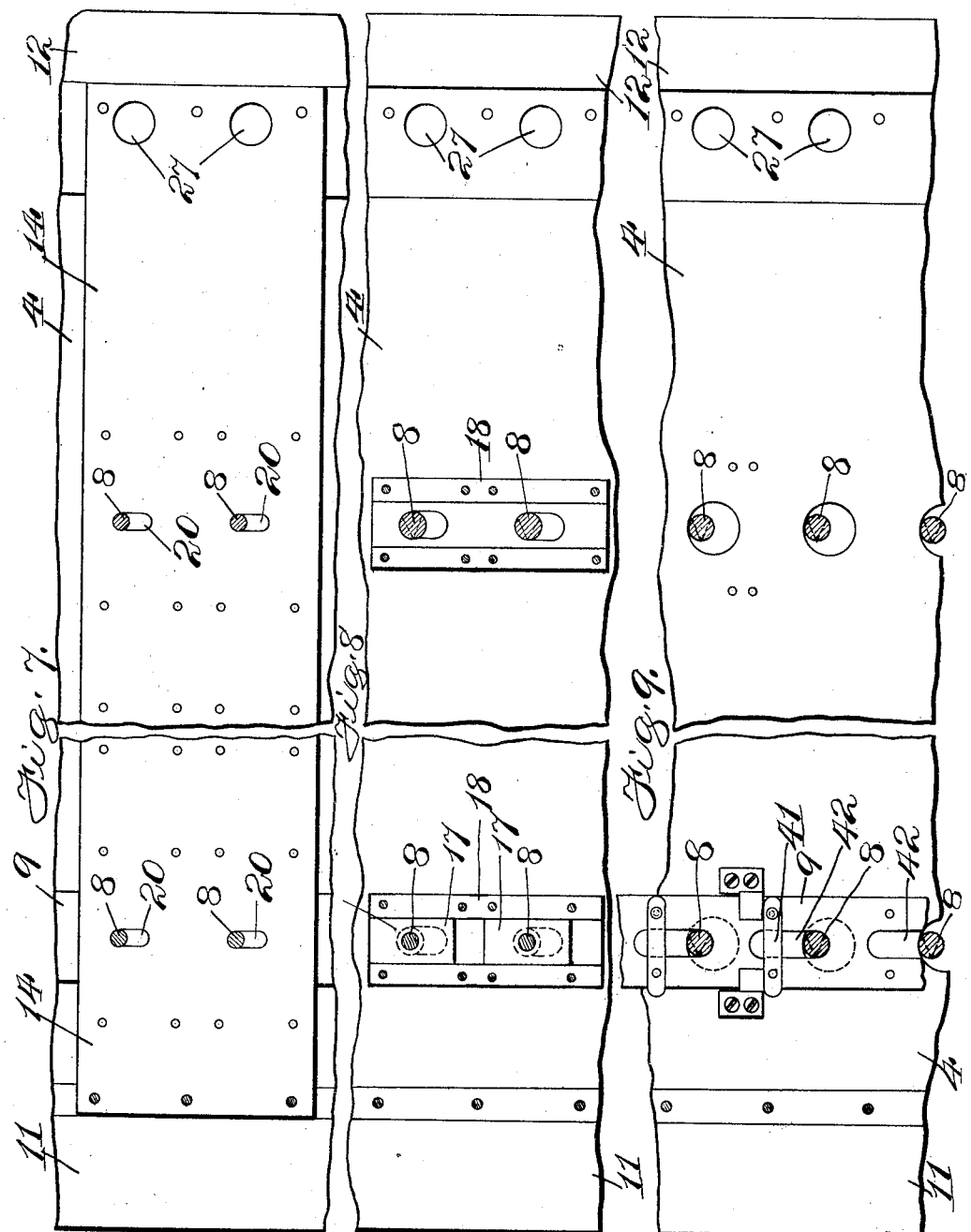

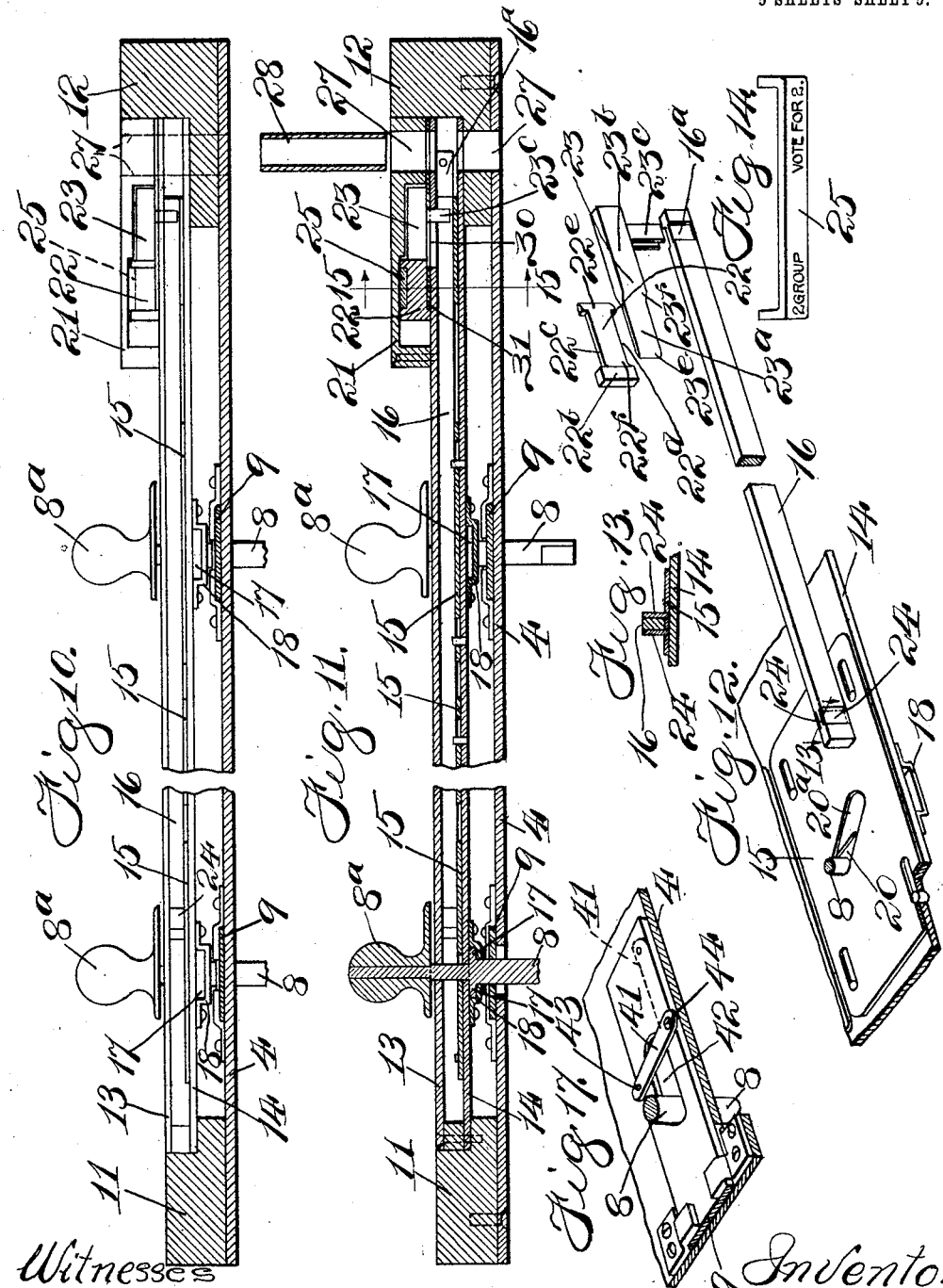

UNITED STATES PATENT OFFICE.

WILLIAM A. SWAREN, OF CHICAGO, ILLINOIS, ASSIGNOR, BY MESNE ASSIGNMENTS, TO INTERNATIONAL VOTING MACHINE COMPANY, OF ELGIN, ILLINOIS, A CORPORATION OF ILLINOIS.

VOTING-MACHINE.

1,001,705.  Specification of Letters Patent.  Patented Aug. 29, 1911.

Application filed September 6, 1906. Serial No. 333,535.

*To all whom it may concern:*

Be it known that I, WILLIAM A. SWAREN, a citizen of the United States, residing at Chicago, in the county of Cook and State of Illinois, have invented certain new and useful Improvements in Voting-Machines, of which the following is a full, clear, and exact specification.

My invention relates to improvements in voting machines, and is particularly adapted for use in machines of the general class shown in my prior Patent No. 728,045, issued May 12, 1903, and in application for Patent Serial No. 177,092, filed August 26, 1903, although adapted for use in machines of other types; and it has for its primary object to provide certain improvements whereby single-candidate and multi-candidate groups are provided and arranged in sections removable and interchangeable throughout the entire ballot face of the machine for the purpose of securing any desired arrangement of the individual candidate vote-recording mechanisms; and it has for its further object to provide improved means whereby the space occupied by the office-group interlocking mechanisms is reduced materially, and whereby efficiency in operation and economy in manufacture are attained, and the liability of the mechanism to get out of working order is reduced to the minimum.

To the attainment of these ends and the accomplishment of other new and useful objects, as will appear, the invention consists in the features of novelty, and in the construction, combination and arrangement of the several parts hereinafter more fully described and claimed, and shown in the accompanying drawings illustrating an exemplification of this invention, and in which;—

Figure 1 is a plan view of a voting machine embodying my improvements, and having parts of ballot and cover plates broken away; Fig. 2 is a vertical sectional view on line 2—2 of Fig. 1; Fig. 3 is a vertical sectional view on line 3—3 of Fig. 1; Fig. 4 is a partial plan view of one of my office-group voting mechanisms shown attached to the shifting plate and frame, with ballot and cover plate broken away to show the interlocking mechanism; Figs. 5, 6, 7, 8 and 9 are continued views of Fig. 4, with parts broken away in succession, showing the interior construction; Fig. 10 is a side elevation of Fig. 4; Fig. 11 is a longitudinal vertical sectional view on line 11—11 of Fig. 4; Figs. 12 and 14 are detail views of parts of the interlocking mechanism; Fig. 13 is a vertical sectional view on line 13—13 of Fig. 12; Fig. 15 is a vertical sectional view on line 15—15, Fig. 11; Fig. 16 is a detail view of a part of the interlocking mechanism, showing the manner of operation of the blocks and wedges; Fig. 17 is a detail of a portion of the sliding key plate and party key controlling strip mounted thereon; Fig. 18 is a vertical section on line 18—18, Fig. 3, showing a detail of the rock shaft and cam operating the shifting key plate; and Fig. 19 is a modified form of the voting keys and related mechanism.

The mechanism is contained in the main frame 1, shaped like a chest or box. The vote-recording registers 2 are mounted on the stationary plate 3, which is supported by the main frame. The mechanism for actuating the registers is carried on the sliding plate 4, which is carried by the main frame and is adapted to have lateral movement thereon sufficient to carry the register-actuating mechanisms into and out of engagement with their associated registers. This movement is accomplished by means of the lever 7, the rock shaft 5 and the cam 6. The register-actuating means embodies the voting pins or keys 8 in well known linear arrangement by party columns and party groups, party voting bars or strips 9 and their controlling levers 10 for party straight-ticket voting, and the interlocking mechanism for controlling the voting keys by office groups, hereinafter described. The party voting bars 9 and their levers 10 are carried on the top of sliding plate 4. The plate 4 also carries on its top side the recessed members 11 and 12, forming a support for the ends of the frames carrying the interlocking group mechanisms. The ballot 40 is on top of the group mechanisms.

I construct my office-group interlocking mechanisms in removable and interchangeable sections, in both single and multi candidate formation. To illustrate my construction, I show, in Figs. 4 to 11 inclusive, the details of a multi-candidate group of two attached to a portion of the sliding ballot plate. Part of ballot 40, Fig. 4, is broken away. Upper and lower plates 13 and 14 form a housing or chamber for cam plates 15 and connecting rods or strips 16. Keys 8 are provided with enlarged portions 17, by which they are mounted in slides 18 on the lower side of plate 14, to have longitudinal movement in slots 19 and 20 in plates 13 and 14. These keys extend also through diagonal cam slots 20$^a$ in cam plates 15, by means of which they are adapted to give these cam plates movement at right angles to movement of keys and associated party-voting strips 9. At one end of the said housing I form, on the top side of plate 13, a second chamber or housing. The interior of this housing is readily accessible by removing the cover plate 21, for the purpose of inspecting or adjusting the interlocking mechanism therein, which consists of a series of laterally movable blocks 22 and a corresponding series of entering wedges 23, having thin, blade-like sections 23$^a$ normally resting between blocks 22, and a thicker body portion 23$^b$. The entering wedges 23 correspond to the number of register-actuating keys in the group. Slot 30 extending laterally across plate 13 receives the depending members 23$^c$ of the entering wedges, which extend downwardly into the main housing and are connected to rods or strips 16. I preferably form these connecting rods or strips rectangular in cross section, as shown, and of a width approximately corresponding to the depth of the main housing. The members 23$^c$ and 24 are bifurcated and take the mortises in 16, as illustrated by 16$^a$ in Fig. 12. This construction is economical in manufacture and in assembling, as the housing plates 13 and 14 retain the rods 16 in position without riveting or other mode of fastening.

It will be seen that the movement of voting keys 8 to voted position, acting on cam plates 15, rods 16 and entering wedges 23, operates to bring the thickened portions 23$^b$ between blocks 22, and to force them laterally apart, as shown in Fig. 16. The lateral movement of blocks 22 is limited by the yoke 25, so that only a predetermined number of the voting keys may be operated simultaneously, and all the remaining voting keys of the group are locked until the voted keys and interlocking members are restored to normal. In single office candidate groups, one space is provided for the operation of only one key at a time, while in multi-candidate groups of two or more, the space may be varied as desired by substituting yokes of various sizes, which should be plainly marked by the manufacturer after the manner shown by the illustration in Fig. 14, providing a yoke adapted to a group of two, as illustrated in Figs. 4 to 11, inclusive. This yoke provides space for the introduction of two of the entering wedges. It is obvious that the size of this yoke may be varied to permit the operation of any desired number of keys in the group. As previously explained, however, I construct these group mechanisms in removable and interchangeable sections, so that they may be arranged at will over the ballot face of the machine, by officers and custodians previous to elections, and by this means I reduce to the minimum the necessity for adjustment of the interlocking mechanisms after they are out of the hands of the manufacturer. In practice, it is found desirable to provide machines with a sufficient number of these group mechanisms to meet all of the known conditions. Other sizes of the groups may be provided subsequently by the manufacturers, to meet varying conditions.

In my construction of wedge blocks 22, I provide the indentations 22$^d$ and 22$^c$ on the upper and lower edges thereof. These indentations serve as guides, and they take the yoke member 25 and guide plate 31. The entering wedges 23 are of a width approximately corresponding to the diminished width of the wedge blocks, so that they do not bind between the yoke and guide plate when forced between the wedges. In order to avoid unnecessary friction and binding in the operation of these parts, I find it most desirable to construct wedge blocks 22 and entering wedges 23 of the same thickness of material at their thickened portions 22$^b$ and 23$^b$, and having the bearing faces of their wedging sections in duplicate. The compact and simple arrangement of these parts, as shown in Figs. 4, 5, 15 and 16, is thus secured. The operative side of each wedge block and of each entering wedge is provided with two corresponding wedging surfaces 22$^e$, 22$^f$, and 23$^e$, 23$^f$ (Figs. 12 and 16). The double wedging at two separated points thus secured preserves the proper alinement of the members 22 and 23, and particularly prevents the blocks 22 from getting out of parallel with each other when being forced apart, and so binding against guide plate 31 and yoke 25. In the construction of multi-candidate groups involving the use of large numbers of these wedging blocks and entering wedges, the form of limiting yoke as described is found highly advantageous, as the action of the entering wedges often compels the lateral movement of the greater part of the blocks and entering wedges. Under such conditions, the action in my construction is to move the smaller division of the parts, and the limiting yoke being free to move laterally in the section, readily accommodates itself to the change, and takes up the vacant space at whichever end of the series it may be found.

In assembling the interlocking mechanisms, it is generally found desirable to employ a number of liners or blank-filling blocks 26, of varying thicknesses, between the wedge blocks 22, and the use of such blanks is often found desirable in connection with the use of various sizes of yokes, as previously described, and for use in taking up wear.

For the purpose of permitting votes to be cast for irregular candidates,—that is, for candidates whose names do not appear on the regular ballot—I provide the holes 27 through members 21, 13 and 14. This passageway is also continued through member 12 and sliding carrying plate 4. Hollow metallic tubes 28 are provided, and if the voter does not wish to vote for any of the candidates on the ballot, he may write the name of the candidate of his choice on a slip of paper and insert it in one of these tubes, to be deposited in the manner to be described. Each group is provided with as many of the holes 27 as there are candidates to be voted on, generally one for each lateral row of office keys in the group. A regular column of voting keys, preferably the column next the housing for the interlocking mechanism, is used for the purpose of enabling an irregular vote to be cast, and no names appear on the ballot in the irregular columns. Thus, in the illustration of a group of two, the voter is permitted to vote for two candidates for the designated office. This he can do by voting for any two of the candidates whose names are on the ballot opposite their respective keys, and when these keys are voted, all the remaining keys in the group, including the two irregular keys, are locked against further voting, in the manner described. But if the voter operates the irregular keys instead, he may deposit the prepared ballot tubes. The connecting rods 16ª controlled by the irregular keys extend beyond the ends of the rods 16, and form a stop across passage 27 when the irregular keys are in normal position. A short cross head 32 may be used on the end of 16ª, or the rod may be flattened or enlarged to form a substantial stop across the passage. When the irregular keys are operated, the end of rod 16ª is withdrawn, which will permit the voter to insert the tube 28 into passage 27, to the position shown in Fig. 2, except that plate 4 and the entire interlocking system thereon should be shifted to the right until voting pins 8 contact with registers 2, which is the position of the parts when the voter would be permitted to insert the tube, and it would be stopped by contact with the top of plate 3. When the voter leaves the booth, he operates the lever 7, which returns the mechanism to the exact position shown in Fig. 2, when the tube will be free to drop through the hole 33 into a receptacle below. Hence the voter can insert only a single irregular ballot in each candidate passage before leaving the booth, and his selection of irregular candidates operates to prevent him from voting for a like number of regular candidates whose names appear on the ballot.

In some States where more than one candidate is to be elected to a single office, the statute provides that if a candidate's name is indorsed by more than one party, and his name consequently appears on the ballot more than once, it shall be illegal to cast more than one vote for him for the same office. In Fig. 1, I show mechanism attached to my interlocking mechanism adapted to meet this condition. The sliding lock block 34 is provided with beveled edges 34ª and 34ᵇ, arranged adjacent to any two of the voting keys 8 on a multi-candidate group section, so that the movement of the keys causes them to operate the block 34 longitudinally, and the movement of one of the keys to voted position operates to lock out the other key. On ballot 40 is shown a multi-candidate group of three, with the name of one candidate appearing in two party columns. The use of lock 34 is shown in dotted lines. These special locks may be of any desired length, operating between candidate keys in adjacent party columns, or between keys in any two of the party columns on the ballot. These locks may be applied on the top plates of the group sections immediately under the paper ballot 40, and retained in position in many ways, but I prefer to tap plate 13 and attach them by screws or pins 35 through longitudinal slots 36.

When officers of elections or custodians desire to prepare my machine for a given election, the interlocking group sections may be given the desired arrangement, or some of them may be removed and other sections substituted. The removable sections embody the plates 13 and 14 and the mechanism between them, and that contained in the upper housing for the interlocking means.

In the embodiment of the invention already described, the voting keys are attached to plates 14, and are consequently removable with the group sections. However, I show in Fig. 19 a modification in the construction of the voting keys and their coacting parts, by which the key is attached to the under side of plate 4, and the key-controlling party strips are also mounted on the under side of plate 4. If the key knobs or handles 8ª are removed in this construction, it will be seen that the interlocking mechanism may be removed and the keys 8 remain in position on plate 4. The party ticket voting strips or bars 9 are operative on voting keys 8 to move them to voted position when the members 41 are in position, extending laterally across slots 42. When it is desired to blank out any number of the voting keys, it may be accomplished by lifting the members 41 off pins 43, which allows them to swing to the position shown in dotted lines in Fig. 17. In this position, they will not advance the keys when the strips 9 are advanced by the party voting levers 10. The action of the party voting bars 9 in returning the voted keys to normal has been fully described in my previous patents already referred to. The return to normal of keys 8, after being voted, operates also to restore their corresponding interlocking mechanisms, for when the cam slots 20ª in plates 15 are acted upon by the retrograde movement of the keys, the plates 15 resume their normal position, which exerts an end thrust on connecting rods 16 sufficient to remove the entering wedges 23 to normal position.

In order that the invention might be fully understood, the details of an embodiment thereof have been thus specifically described, but

What I claim is,—

1. A voting machine embodying a ballot face, a plurality of individual candidate vote registering means, interlocking means controlling said vote registering means by office groups, said interlocking means being arranged in a plurality of sections or divisions, being detachable and interchangeable throughout the ballot face of the machine, and means for securing said sections in any desired arrangement.

2. A voting machine embodying a plurality of individual candidate vote-registering means, means controlling said means by party divisions or columns and by office groups, said office-group means embodying interlocking mechanisms in sectional arrangement and being detachable and interchangeable throughout, and means for permitting any desired arrangement of said interlocking sections.

3. In a voting machine, the combination with a ballot face and individual candidate vote-registering registers, of actuating keys therefor, and single office group and multi-candidate office group interlocking mechanisms in detachable and interchangeable arrangement on the ballot face of the machine.

4. In a voting machine, individual candidate vote-recording means, actuating means therefor, and a ballot face embodying office group interlocking mechanisms, said mechanisms detachably arranged by office groups and interchangeable throughout said ballot face.

5. In a voting machine, the combination of a ballot face, a plurality of individual candidate vote-recording registers, actuating keys therefor, office group interlocking means controlling said actuating keys, said interlocking means arranged in detachable predetermined office group sections, and means for permitting the interchanging of said interlocking means over the ballot face of the machine.

6. In a voting machine, the combination of single candidate vote-recording means, means controlling said means by party columns and by office groups, said office groups controlled by interlocking means in single group and multi-candidate group arrangement, and means comprising a longitudinally movable cam plate whereby the vote-recording means in different party columns in the same multi-candidate group may be controlled in pairs, the operation of one of the vote-recording means rendering the other inoperative by interposing the cam plate in the path of said other vote-recording means.

7. In a voting machine a ballot plate, a plurality of vote recording registers adjacent one side of the plate, the other side thereof serving as a ballot face, register actuating means operable from the ballot face of the plate through apertures therein, and a housing on the ballot face adapted to contain suitable interlocking mechanism.

8. In a voting machine a ballot plate, a plurality of vote recording registers adjacent one side of the plate, the other side thereof serving as a ballot face, register actuating means operable from the ballot face of the plate through apertures in the plate, and interlocking mechanism on the ballot face of the plate.

9. In a voting machine a ballot plate, a plurality of vote recording registers adjacent one side of the plate, the other side thereof serving as a ballot face, register actuating means operable from the ballot face of the plate through apertures in the plate, interlocking mechanism in a housing on the ballot face of the plate, and suitable connecting means extending therefrom through the plate to the register actuating means.

10. In a voting machine a ballot plate, a plurality of vote recording registers adjacent one side of the plate, the other side thereof serving as a ballot face, register actuating means operable from the ballot face of the plate through apertures in the plate, interlocking mechanism on the ballot face of the plate beyond the plane thereof, and a suitable housing therefor.

11. In a voting machine a ballot plate, a plurality of vote recording registers adjacent one side of the plate, the other side thereof serving as a ballot face, register actuating means operable from the ballot face of the plate through apertures in the plate, and interlocking means on the ballot face of the plate for controlling the register actuating means whereby the said interlocking means is accessible without removing the plate.

12. In a device of the character described, the combination of a main housing containing longitudinally-movable members connected at one end thereof with individual candidate vote-recording means, an auxiliary housing communicating with said main housing and lying out of the plane thereof, interlocking means in said auxiliary housing embodying blocks and entering wedges, and means for connecting said entering wedges with said longitudinally-movable members.

13. In a voting machine a ballot plate, a plurality of vote recording registers adjacent one side of the plate, the other side thereof serving as a ballot face, register actuating means operable from the ballot face of the plate through apertures in the plate, and interlocking mechanism adapted to control the register actuating means, comprising suitable connecting means extending from said register actuating means on the register side of the plate to the ballot face thereof, and coöperating interlocking blocks and wedges on the ballot face of the plate.

14. In a device of the character described, the combination of a main housing containing longitudinally movable members connected at one end thereof with individual candidate vote-recording means, an auxiliary housing communicating with said main housing and lying out of the plane thereof, interlocking means in said auxiliary housing accessible from the front of the housing, said interlocking means embodying blocks and entering wedges, and means for connecting said entering wedges with the longitudinally movable members.

In testimony whereof I have signed my name to this specification, in the presence of two subscribing witnesses, on this 21st day of August, A. D. 1906.

WILLIAM A. SWAREN.

Witnesses:
EDWIN C. SEMPLE,
A. L. SPRINKLE.

---

Copies of this patent may be obtained for five cents each, by addressing the "Commissioner of Patents, Washington, D. C."